United States Patent
Guha et al.

(10) Patent No.: US 8,190,473 B2
(45) Date of Patent: May 29, 2012

(54) CATEGORY SIMILARITIES

(75) Inventors: Angshuman Guha, Los Gatos, CA (US); Xuefu Wang, Los Altos, CA (US); Oren E. Zamir, Los Altos, CA (US); Aitan Weinberg, New York, NY (US)

(73) Assignee: Google Inc., Mountain View, CA (US)

( * ) Notice: Subject to any disclaimer, the term of this patent is extended or adjusted under 35 U.S.C. 154(b) by 324 days.

(21) Appl. No.: 12/401,318

(22) Filed: Mar. 10, 2009

(65) Prior Publication Data

US 2010/0235220 A1    Sep. 16, 2010

(51) Int. Cl.
*G06Q 30/00*  (2006.01)
(52) U.S. Cl. .......... 705/14.4; 705/14.49; 705/14.54; 705/14.73
(58) Field of Classification Search .......... 705/14.4, 705/14.49, 14.54, 14.73
See application file for complete search history.

(56) References Cited

U.S. PATENT DOCUMENTS

| | | | |
|---|---|---|---|
| 5,754,939 A | 5/1998 | Herz et al. | |
| 6,144,944 A | 11/2000 | Kurtzman et al. | |
| 2002/0049635 A1 | 4/2002 | Mai et al. | |
| 2005/0131762 A1 | 6/2005 | Bharat et al. | |
| 2007/0094042 A1 | 4/2007 | Ramer et al. | |
| 2007/0233375 A1 | 10/2007 | Garg et al. | |
| 2008/0172422 A1* | 7/2008 | Li et al. | ......... 707/202 |
| 2009/0024470 A1 | 1/2009 | Mandelson et al. | |
| 2010/0070339 A1 | 3/2010 | Bae et al. | |

OTHER PUBLICATIONS

"VEOH Launches New Behavioral Targeting Solution for online video ads and Branded Content", http://www.veoh.com/static/corporate/press_releases/07_14_2008.html; Veoh Networks, dated Jul. 14, 2008.
International Search Report from International Application No. PCT/US2010/026794 mailed Apr. 28, 2010, 2 pages.
U.S. Appl. No. 12/549,991, filed Aug. 28, 2009, Reaching Internet Users Based on Assigned Interest Categories, Jakobi et al.
International Search Report from International Application No. PCT/US2010/026794 mailed Apr. 28, 2010, 8 pages.
International Search Report from International Application No. PCT/US2004/042912 mailed Jul. 22, 2006, 1 page.

* cited by examiner

*Primary Examiner* — Raquel Alvarez
(74) *Attorney, Agent, or Firm* — Fish & Richardson P.C.

(57) ABSTRACT

Methods, systems, and apparatus for determining similarity measures between vertical categories based on users' online activities. The similarity measures are symmetric similarity measures based on both a similarity measure of a first vertical category relative to a second vertical category and a similarity measure of the second vertical category relative to the first vertical category.

22 Claims, 5 Drawing Sheets

CATEGORY SIMILARITIES

BACKGROUND

This specification relates to providing digital content.

The Internet provides access to a wide variety of content items, e.g., video and/or audio files, web pages for particular subjects, news articles, etc. Such access to these content items has likewise enabled opportunities for providing targeted content, such as advertisements. In one type of targeted advertising, the subject matter of a content item accessed by a user can be used to select advertisements, as accessing a content item can be an indication of user interest in the content item's subject matter. For example, if a user accesses a web page discussing automobiles then advertisements related to automobiles are selected and provided to the user.

Users interested in one subject matter category may also be interested in other subject matter categories. Modifying the advertisement candidate set to include advertisements related to other subject matter categories other than the subject matter of the content item the user is viewing and in which the user has an interest or is likely to have an interest can provide a rich set of advertisements that are related to several interests of the user. For example, if it is known that users interested in automobiles are also likely interested in boating, then the advertisements provided to the users can be selected from an advertisement candidate set including both automobile-related advertisements and boating-related advertisements. However, such category similarities are usually inferred from term matching between web pages belonging to particular categories or from data explicitly provided in user profiles. These inferences do not take into account actual user behavior.

SUMMARY

In general, one aspect of the subject matter described in this specification can be embodied in methods that include identifying event data for a user identifier based on past user sessions associated with the user identifier, the event data specify events that occurred during the past user sessions; categorizing each of the events as belonging to one or more vertical categories; for each vertical category, determining a user identifier interest weight for the user identifier based on the events associated with the vertical category; generating symmetric association data representative of a symmetric association of a given vertical category with at least one other vertical category based on the user identifier interest weights, the symmetric association being pairs of equal similarity measures where an equal similarity measure is based on a first similarity measure of a first vertical category relative to a second vertical category and a second similarity measure of the second vertical category relative to the first vertical category; and selecting advertisements for user sessions associated with a user identifier based on the symmetric association data. Other embodiments of this aspect include corresponding systems, apparatus, and computer program products.

Particular implementations of the subject matter described in this specification can be implemented so as to realize one or more of the following advantages. Advertisements are selected based on exhibited user behavior with respect to the user interests in various vertical categories. The user behavior is less subject to biases that may be present when users list their own interests in profiles. An empirical process that identifies vertical categories for which the behavior of many users indicate an overlapping interest in the vertical categories can identify similar vertical categories that may not be identified as similar based on other techniques, such as term clustering. These advantages can be separately realized or realized in combination in various implementations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, the subject matter of this specification relates to determining similarities between vertical categories of web content that is categorized into vertical categories according to the subject matter of the web content. Similarities between vertical categories can be derived from events that occurred during users' past user sessions (e.g., past online activities) and/or from other user information (e.g., social networking profiles, users' browser data, users' activity patterns, users' friends, geographic data). An event is an action that occurs during a user session and is indicative of a user interest (or lack of interest) in a vertical category. Example events include a web page view for a web page that belongs to a particular vertical category, an advertisement click-through for an advertisement that belongs to a particular vertical category, or a conversion related to a product or service that belongs to a particular vertical category.

The events can be used to infer users' interests in various vertical categories and, in turn, the similarity between vertical categories can be based on the inferred users' interests. User interests for a user can be inferred from the subject matter of vertical categories to which the events of that user's online activities belong. The amount of activity as measured by the number and types of events for a user belonging to a given vertical category can be used to gauge the level of the user's interest in the vertical category. Across all users, if the inferred users' interests indicate that users interested in a first vertical category are also interested in a second vertical category, e.g., the vertical categories likely have overlapping groups of interested users, then these vertical categories can be determined to be similar.

Similarity between vertical categories can be used to target advertisements to users. For example, if a user visits a web page belonging to a first vertical category that is determined to be similar to a second vertical category, then advertisements in the first vertical category and advertisements in a second vertical category are selected for presentation to the user.

§1.0 Example Operating Environment

Figure 1:
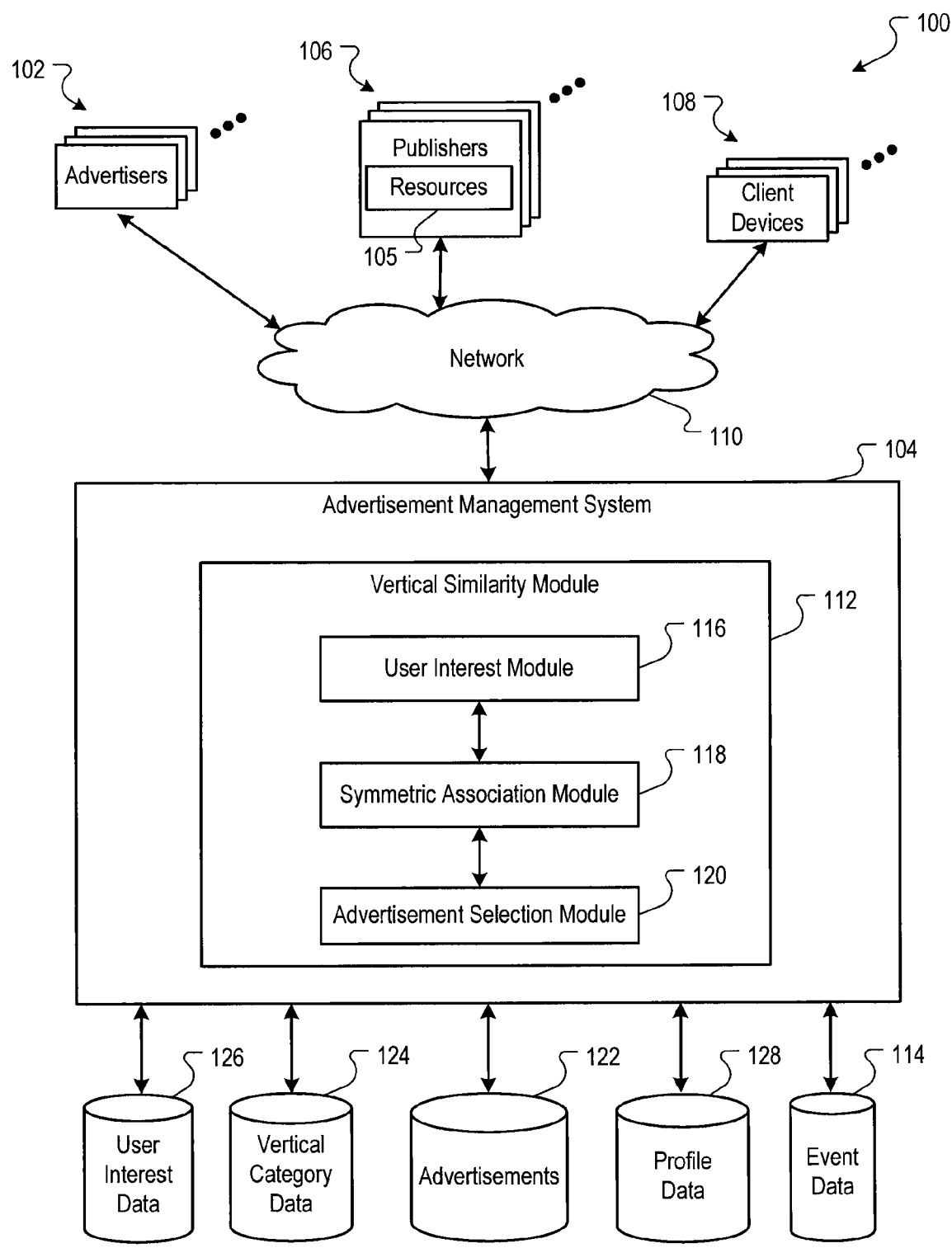
FIG. 1 is a block diagram of an example environment in which a vertical similarity module can be implemented.

FIG. 1 is a block diagram of an example environment 100 in which a vertical similarity module 112 can be implemented. The online environment 100 can facilitate the identification and serving of web content, e.g., web pages, advertisements, etc., to users. A computer network 110, such as a local area network (LAN), wide area network (WAN), the Internet, or a combination thereof, connects advertisers 102, an advertisement management system 104, publishers 106, and client devices 108. The online environment 100 may include numerous advertisers 102, publishers 106 and client devices 108.

One or more advertisers 102 can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisement gadgets with or without interactive features, advertisements combining one of more of any of such components, etc., or any other type of electronic advertisement document. The advertisements may also include embedded information, such as a links, meta-information, and/or machine executable instructions, such as HTML or JavaScript™.

A publisher 106 is any web site that hosts and provides electronic access to a resource (e.g., web page content) by use of the network 110. A web site is one or more resources 105 associated with a domain name. An example web site is a collection of web pages formatted in hypertext markup language (HTML) that can contain text, graphic images, multimedia content, and programming elements, such as scripts.

A resource is any data that can be provided by the publisher 106 over the network 110 and that is associated with a resource address. Resources include HTML pages, word processing documents, and portable document format (PDF) documents, images, video, and feed sources, to name just a few. The resources can include content, such as words, phrase, pictures, videos, and so on, and may include embedded information (such as meta information and hyperlinks) and/or embedded instructions (such as JavaScript scripts).

A client device 108 is electronic device that is under the control of a user and is capable of requesting and receiving data over the network 110. A client device 108 typically includes a user application, such as a web browser, to facilitate the sending and receiving of data over the network 110, such as requesting a resource (e.g., page content) from a publisher 106. Example client devices 108 include personal computers, mobile communication devices, and other devices that can send and receive data over the network 110.

Publishers 106 can submit advertisement requests for one or more advertisements to the system 104. The system 104 responds by sending the advertisements to the requesting publisher 106 for provisioning with one or more of the publisher's resources. Alternatively, the system 104 responds by sending the advertisement directly to the client device 108 in response to a client device request for a resource from a publisher 106, typically via embedded instructions received by the client device 108 from the publishers 106.

The advertisements can include embedded links to landing pages, i.e., pages on the advertisers 102 websites that a user is directed to when the user clicks an advertisement presented on a publisher 106 website. The advertisement requests can also include resource request information. This information can include the resource itself (e.g., web page), a category corresponding to the resource (e.g., arts, business, computers, arts-movies, arts-music, etc.), part or all of the resource request, resource age, resource type (e.g., text, graphics, video, audio, mixed media, etc.), geo-location information, etc.

§2.0 Vertical Similarity Module

The advertisement management system 104 includes a vertical similarity module 112. The vertical similarity module 112 generates data characterizing the similarities between vertical categories. The data characterizing similarities between vertical categories is based on users' interests in the vertical categories, which are inferred from events that occurred during past user sessions for the users during a particular time period. In other implementations, the data characterizing the similarities between vertical categories can also be based on, for example, users' social networking profiles, users' browser data, users' activity patterns, users' friends, and geographic data.

Past user sessions for a user can be identified in various ways. For example, a user account for a user (e.g., a user account for a search engine or other network system) can be used to identify past user sessions for the user. Each user account can be keyed to a user identifier that is uniquely associated with a user, and the user identifier is also associated with past user sessions for its account. Such an account-based user session begins with the user logging into the user account and is maintained until the user logs out of the account. Upon granting permission to track the user's history (e.g., the user opts-in to allow the user's online activities to be tracked), historical data for the user's sessions and other user data are tracked and associated with the user identifier. At the user's option, only data approved by the user are tracked (e.g., if the account is for a search engine, the user may specify that only search queries and search result selections are tracked). The user can clear all historical data associated with the user account at any time, and can opt-out of such tracking at any time. Further, to protect the privacy of the user, the historical data can be anonymized so that the data cannot be associated with the user.

In some implementations, past user sessions for a particular user can also be identified based on an identifier associated with the client device 108 used by the user. For example, the IP address of the client device 108 can be used to infer a past user session for the user (e.g., the IP address of the client device 108 can be included in a request for information from a publisher).

In some implementations, upon a user granting permission, past user sessions can further be identified by access to and use of a data file stored on a client device 108. For example, a cookie stored on a client device 108 can be used to identify the client device 108 and access information about past online activities facilitated by the client device 108.

The events and associated information occurring during the past user sessions for the users can be stored in an event data store 114. The event data store 114 can store data about events, such as advertisement click-throughs, web page views, conversions, user searches, and video views, to name just a few. The data in the event data store 114 can be partitioned, for example, according to users or user identifiers. A user profile data store 128 can be used to store other information associated with the user such as declared profiles (e.g., social networking profiles), browser data (e.g., user agent), user activity patterns (e.g., time of day), users' friends, geographic data, etc.

§2.1 User Interest Module

The vertical similar module 112 can include a user interest module 116. The user interest module 116 can determine user interests for users in particular vertical categories. For each vertical category, the user interest in the vertical category can be determined based on the events related to the vertical category that occurred during the past user sessions. The user interest module 116 can categorize each of the events as belonging to one or more vertical categories based on the subject matter associated with the event and subject matter associated with the vertical categories. For example, a web page view event for a web page categorized in a sports vertical category can be categorized as belonging to the sports category vertical.

To facilitate the categorization process the user interest module 116 can access vertical category data from the vertical category data store 122. The vertical category data 122 stores data that categorizes web content according to the subject matter of the web content. For example, web pages that provide movie related information can be categorized in the entertainment/movies vertical category.

Web content can also be categorized by more than one vertical category. For example, a sports news web page may have a majority of its content directed to current events of different sports. However, the sports news web page may also include an abbreviated listing of a few sports-related programs. As such the sports news web page may be categorized in both a sports vertical category and an entertainment/TV/TV programs vertical category.

Likewise, advertisements and their associated landing pages can also be categorized in the vertical categories, and the categorization can be stored in the vertical category data store 122.

The user interests for a user can be inferred from the subject matter of vertical categories to which the events of that user's online activities belong. The amount of activity as measured by the number and types of events for a user belonging to a given vertical category can be used to gauge the level of the user's interest in the vertical category.

The number of events for a user that occurred during the past user sessions in the same vertical category can be used as a measure of user interest in the vertical category. For example, if a first user has ten page views of web pages categorized in a sports vertical category during the past week and a second user has only one page view of web pages categorized in the sports vertical category during the same time period then it can be inferred that the first user has a stronger interest than the second user in the subject matter of the sports vertical category. As such, the interest for a user in a particular vertical category can be based on a weighted scheme, as determined by events that occurred during past users sessions for the user ("user identifier interest weight").

§2.1.1 Example Interest Weight Calculation

In some implementations, the user identifier interest weights for a user in vertical categories that categorize web pages that were viewed, advertisements that were clicked/selected, or landing pages that were visited can be determined according to, for example, Equation 1:

$$\sum_{\in event\_data} (W(P)*IDF + W(AC) + W(AL)*CW + W(AL)*CVW) \quad (1)$$

For any given time period (e.g., duration during which a set of past user sessions occurred) and a particular user identifier, Equation 1 provides a list of vertical categories and respective user identifier interest weights in those vertical categories.

P represents the vertical categories categorizing the web pages the user has viewed. W(P) is a weight of a vertical category for a web page. The weight of a vertical category for a web page (or any other web content) is determined by the extent of the web page's content directed to the subject matter of the vertical category. As noted above, a sports news web page may be categorized in both a sports vertical category and an entertainment/TV/TV programs vertical category. As the content of the sports news web page is dominated by the current events portion, the weight for the sports vertical category will be higher relative to the weight for the entertainment/TV/TV programs vertical category. For example, based on a normalized scheme, the weight for the sports vertical category for the sports news web page may be 0.8 and the weight for the entertainment/TV/TV programs vertical category may be 0.2.

Many different types of weighting algorithms can be used to determine the weight of a vertical category for a web page. For example, term clustering can be used to identify terms that are clustered according to various categories, and the number of terms in each cluster and the total number of terms in a page can be used to determine the weights.

IDF is the inverse document frequency for a web page based on the number of visitors that have visited the web page. IDF is inversely proportional to the number of visitors. Thus if a first web page has only a few visitors the IDF for that web page will be higher than the IDF for a second web page that has more visitors than the first web page.

AC represents the vertical categories categorizing the advertisements of the advertisement click-throughs. W(AC) is a weight of a vertical category for an advertisement. W(AC) is determined in a manner similar to W(P) but in relation to the content of an advertisement rather than a web page.

AL represents the vertical categories categorizing the landing pages of the advertisements. W(AL) is a weight of a vertical category for a landing page. W(AL) is determined in a manner similar to W(P) but in relation to the content of the landing page rather than a web page.

CW is a weight of the click duration associated with an advertisement click-through (e.g., the longer the click, the higher the weight of the click duration). A length of a click can be measured based on how long a session dwells on the landing page after a click and on clicks on additional links that are present on the landing page.

CVW is a weight associated with a conversion. In some implementations, the weight is the same for all conversions. In other implementations, the weight is proportional to a magnitude of the conversion if a magnitude can be measured, e.g., a price associated with a purchase.

To illustrate how a user interest weight in a vertical category is determined, Equation (1) will be applied to the values shown in Table 1. Table 1 shows exemplary event data for a user that occurred during three past user sessions in a vertical category 1:

TABLE 1

| | Web page view/IDF/W(P) | Ad click-throughs/W(AC)/ W(AL)/CW | Conversion/ CVW |
|---|---|---|---|
| Past user ses. 1 | Web page A/0.5/0.4 | | |
| Past user ses. 2 | Web page B/0.7/0.6 | Ad X/0.3/0.8/0.2 | Ad X/0.3 |
| Past user ses. 3 | Web page A/0.5/0.4 | Ad Y/0.9/0.5/0.1 | |

A user identifier interest weight for the user in vertical category 1 can be generated by processing the event data shown in Table 1, and the associated information, by use of Equation 1, as shown Table 2:

TABLE 2

|  | Web page weight | Ad click-through weight | Conversion weight |
|---|---|---|---|
| Web page A | W(P) * IDF = 0.4 * 0.5 = 0.2 | | |
| Web page B | W(P) * IDF = 0.6 * 0.7 = 0.42 | | |
| Ad X | | W(AL) * CW = 0.8 * 0.2 = 0.16 | W(AL) * CVW = 0.8 * 0.3 = 0.24 |
| Ad Y | | W(AL) * CW = 0.5 * 0.1 = 0.05 | |

The web page weight for web page A is 0.4 (2*0.2), as it was viewed during both past user session 1 and 3, the web page weight for web page B is 0.42, the ad click through weight for ad X is 0.16, the conversion weight for ad X is 0.24, and the ad click-through weight for ad Y is 0.05. Thus According to Equation 1, the user identifier interest weight in vertical category 1 is 2.47:

$$(W(P)*\text{IDF})_{web\ page\ A}+(W(P)*\text{IDF})_{web\ page\ B}+\\(W(AC))_{adX}+(W(AC))_{adY}+(W(AL)*CW)_{adX}+\\(W(AL)*CW)_{adY}+(W(AL)*CVW)_{adX}=0.4+0.42+\\0.3+0.9+0.16+0.05+0.24=2.47$$

The user identifier interest weights can be stored in the user interest data store 126.

In some implementations, the user identifier interest weights can be normalized relative to the average user interest weight in the vertical category. Such normalization facilitates a comparison of user identifier interest weights between vertical categories. For example, a particular user may have a raw user identifier interest weight of 1.5 in a first vertical category and a raw user identifier interest weight of 1.2 in a second vertical category. The average user identifier interest weight in the first vertical category is 1.6 and the average user identifier interest weight in the second vertical category is 0.3. Thus the user has a less than average user identifier interest weight in the first vertical category and a more than average user identifier interest weight in the second vertical category, even though the user's raw weight in the first vertical category is greater than the user's raw weight in the second vertical category.

Although Equation 1 relies on only the web pages viewed, the advertisements clicked, and conversions to determine the user interest weights, other event data can also be used such as user searches, video views, etc. Additionally, methods other than that described by Equation 1 can be used to generate the user identifier interest weights.

§2.2 Symmetric Association Module

The vertical similarity module 112 includes a symmetric association module 118. The symmetric association module 118 can generate symmetric association data that is representative of a symmetric association of a vertical category with another vertical category. The symmetric associations are based on, for example, the user identifier interest weights, and are pairs of equal similarity measures. The equal similarity measures are based on a first similarity measure of a first vertical category relative to a second vertical category and a second similarity measure of the second vertical category relative to the first vertical category. As explained below, symmetric associations provide symmetric similarity measures between vertical categories that are not skewed by the popularity of a particular vertical category.

In some implementations, the symmetric similarity module 118 generates the symmetric associations by generating a first matrix relating the user identifier interest weights with the vertical categories, generating a second matrix from the first matrix relating the vertical categories to each other. When the second matrix is first generated, the measures that relate the vertical categories are asymmetric, as described below. These asymmetric similarity measures in the second matrix are processed to generate symmetric similarity measurements that measure symmetric associations between the vertical categories.

The first matrix has columns defining by vertical categories and rows defining user identifiers. Each cell in the first matrix is populated with a user identifier interest weight corresponding to a vertical category and a user identifier. The user identifier interest weights can be determined, for example, according to Equation 1.

The second matrix has columns defining the vertical categories and rows defining the vertical categories. Thus the second matrix relates the vertical categories to each other and has a size of V×V, where V is the number of vertical categories in the first matrix. In some implementations, the second matrix can be generated, in part, from the first matrix by a collaborative filtering process.

To generate similarity measures between the vertical categories for the second matrix, the symmetric association module 118 normalizes each row of the second matrix. In some implementations, the normalization involves dividing the value in each cell in the row by the sum of all values in the row. These similarity measures are similarity measures of one vertical category relative to another vertical category.

After normalization, the value in each cell of the second matrix, which is defined by a row corresponding a vertical category and a column corresponding to a vertical category, is interpreted as a conditional probability between the vertical categories corresponding to the cell. For example, $p_{ij}$, the value in a cell defined by a row corresponding to vertical i and a column corresponding to vertical category j, (cell$_{ij}$) is the probability of vertical j being similar to vertical i such that $p_{i0}+p_{i1}+\ldots+p_{iV}=1$. After normalization, the second matrix is asymmetric, as $p_{ij}$ is not necessarily equal to $p_{ji}$, and thus the conditional probabilities in the second matrix are asymmetric similarity measures.

The symmetric association module 118 generates symmetric similarity measures for the second matrix. As noted above, a consequence of symmetric similarity measures is that popular vertical categories, e.g., vertical categories in which many user identifiers have high user identifier interest weights (e.g., above average weights), cannot dominate the similarity metric. For example, a pair of vertical categories i and j may have a high similarity measure not because they are similar but because vertical category i is popular. This shows up as an asymmetry in similarity measures.

In some implementations, the symmetric association module 118 generates the symmetric similarity measures for the second matrix by reflecting the second matrix, which eliminates the asymmetry resulting from popular vertical categories. Reflection describes a process by which the value $p_{ij}$ in cell ij, is replaced with a value based on the values, $p_{ij}$ and $p_{ji}$, in cell ij and cell ji, respectively. Thus $p_{ij}$ and $p_{ji}$ are the same and are referred to as a pair of equal similarity measures. The value in each cell in the symmetric similarity matrix is based on complementary conditional probabilities.

The sections below provide an example of generating the first and second matrices.

§2.2 The First Matrix

Given a collection of user identifier interest weights in various vertical categories, for example, as determined according to Equation 1, the symmetric association module 118 generates the first matrix, as shown in Table 1:

TABLE 1

| User Identifier | Vertical Category | | |
| --- | --- | --- | --- |
| | Vertical Category 1 | Vertical Category 2 | Vertical Category 3 |
| User Identifier A | 1.3 | 0.5 | 0.9 |
| User Identifier B | 0.4 | 0.8 | 1 |
| User Identifier C | 0.7 | 1.1 | 0.6 |

For exemplary purposes, Table 1 includes only three user identifiers and three vertical categories, however, many more user identifiers and vertical categories can be used utilized to generate the first matrix.

§2.3 The Second Matrix

As discussed above, the second matrix is based on the first matrix and relates the vertical categories to each other. The process by which the second matrix is generated includes a collaborative filtering process or another process that relates the vertical categories. In some implementations, the collaborative filtering process can be used to generate vertical category pair weights for each pair of vertical categories i and j in a row (corresponding to a user). Vertical category pair weights are used to determine, in part, the asymmetric similarity measures. Vertical category pair weights can be determined, for example, according to Equation 2:

$$\text{Vertical Category Pair Weights for } V_{i,j} = (\min(w_i, w_j))/(\text{sum}(U) - \min(w_i, w_j)) \quad (2)$$

Where:

min ($w_i$, $w_j$) is the minimum value of the user identifier interest weights corresponding to the pair of vertical categories i, j; and sum(U) is the sum of all user identifier interest weights in the row.

Equation 2 provides for each row in the first matrix and each pair of vertical categories (i.e., cells) in the row a vertical category pair weight for the pair of vertical categories. For example, vertical category pair weights for the user identifier interest weights shown in Table 1 can be determined according to Equation 2 as shown in Table 2:

TABLE 2

| | Pair Weight $V_{1,2}$ | Pair Weight $V_{1,3}$ | Pair Weight $V_{2,3}$ |
| --- | --- | --- | --- |
| User Identifier A | 0.227 | 0.500 | 0.227 |
| User Identifier B | 0.222 | 0.222 | 0.571 |
| User Identifier C | 0.412 | 0.333 | 0.333 |

With reference to user identifier A and according to Equation 2, the vertical category pair weight for vertical categories 1 and 2 (i.e., pair weight $V_{1,2}$) is 0.227; 0.5 (the minimum user identifier interest weight between 1.3 for vertical category 1 and 0.5 for vertical category 2) divided by the row sum 2.7 (1.3+0.5+0.9) minus 0.5 (the minimum user identifier interest weight). In a similar manner, the vertical category pair weights for the other vertical category pairs and user identifiers are determined.

Once the vertical category pair weights for all user identifiers have been determined, like pair weights from each user identifier are aggregated, e.g., pair weight $V_{1,2}$ from user identifiers A, B, and C are aggregated. The pair weights can be aggregated, for example, according to Equation 3:

$$\sum_{user\_identifiers} \text{pair\_weigth\_}V_{i,j} \quad (3)$$

Aggregating the vertical category pair weights shown in Table 2 according to Equation 3 results in aggregated vertical category pair weights for $V_{1,2}$, $V_{1,3}$, and $V_{2,3}$ of 0.861 (0.227+0.222+0.412), 1.055 (0.500+0.222+0.333), and 1.131 (0.227+0.571+0.333), respectively. Table 3 shows the aggregated vertical category pair weights arranged in a matrix (e.g. the intermediate matrix) having dimensions 3×3 (i.e., V×V):

TABLE 3

| | Vertical Category 1 | Vertical Category 2 | Vertical Category 3 |
| --- | --- | --- | --- |
| Vertical Category 1 | | 0.861 | 1.055 |
| Vertical Category 2 | 0.861 | | 1.131 |
| Vertical Category 3 | 1.055 | 1.131 | |

The diagonal cells in the matrix shown in Table 3 do not include values (or includes null values) as those cells correspond to the same vertical category. By normalizing the values in Table 3 by row, the resulting values can be interpreted as conditional probabilities (i.e., asymmetric similarity measures) for the vertical categories. The rows can be normalized, for example, by dividing the cell value by the row sum of the corresponding row, as shown in Table 4, which illustrates the normalized second matrix:

TABLE 4

| | $V_1$ | $V_2$ | $V_3$ |
| --- | --- | --- | --- |
| $V_1$ | | 0.861/(0.861 + 1.055) = 0.450 | 1.055/(0.861 + 1.055) = 0.550 |
| $V_2$ | 0.861/(0.861 + 1.131) = 0.432 | | 1.131/(0.861 + 1.131) = 0.658 |
| $V_3$ | 1.055/(1.055 + 1.131) = 0.483 | 1.131/(1.055 + 1.131) = 0.517 | |

It should be noted that the vertical category pair weights can be determined according to methods other than those described by Equation 2. For example, the vertical category pair weights for a user can be determined according to Equations 4, 5, or 6:

$$\text{Vertical Category Pair Weights} = 1/(n-1) \quad (4)$$

where n is the number of vertical categories for the user with a non-zero user interest weight, for n greater than 1. Equation 4 ignores the user identifier interest weights except to signify the presence or absence of events associated with a particular vertical category.

$$\text{Vertical Category Pair Weights for } V_{i,j} = (\min(w_i, w_j))/\text{sum}(U) \quad (5)$$

Where:

min ($w_i$, $w_j$) is the minimum value of the user identifier interest weights corresponding to the pair of vertical categories i, j; and sum (U) is the sum of all user identifier interest weights in the row.

$$\text{Vertical Category Pair Weights for } V_{i,j} = w_j/(\text{sum}(U) - w_i) \quad (6)$$

Where $w_j$ is the user identifier interest weight corresponding vertical category j;

$w_i$ is the user identifier interest weight corresponding vertical category I; and sum(U) is the sum of all user identifier interest weights in the row.

§2.4 The Symmetric Similarity Matrix

The symmetric association module 118 can reflect the second matrix to generate the symmetric similarity matrix which has equal similarity measures (or, equivalently, symmetric similarity measures). As described above, reflection describes a process by which the asymmetric similarity measure in a cell ij ($p_{ij}$) of the second matrix, corresponding to vertical categories i and j, is replaced by a product of the asymmetric similarity measure in cell ij ($p_{ij}$) and the asymmetric similarity measure in cell j, i ($p_{ji}$). Thus each cell in the symmetric similarity matrix is based on complementary conditional probabilities. The symmetric similarity measures can be determined according to, for example, Equation 7:

$$p_{ij} = p_{ij} * p_{ji} \tag{7}$$

Table 5 represents the symmetric similarity matrix as determined by the asymmetric similarity measures of Table 4 according to Equation 7:

TABLE 5

| | VC 1 | VC 2 | VC 3 |
|---|---|---|---|
| VC 1 | | 0.450 * 0.432 = 0.194 | 0.551 * 0.483 = 0.266 |
| VC 2 | 0.432 * 0.450 = 0.194 | | 0.658 * 0.517 = 0.340 |
| VC 3 | 0.483 * 0.551 = 0.266 | 0.517 * 0.658 = 0.340 | |

The equal similarity measures (symmetric similarity measures) between vertical categories 1 and 2 is 0.194, between vertical categories 1 and 3 is 0.266, and between vertical categories 2 and 3 is 0.340.

The relative similarity between verticals can be determined based on the equal similarity measures. For a given vertical category, the vertical category most similar to the given vertical category is the vertical category that has the highest equal similarity measure with the given vertical category. For example, with reference to vertical category 1, vertical category 3 is more similar to vertical category 1 than vertical category 2, as reflected in the higher similarity measure (0.226 for vertical category 3 vs. 0.194 for vertical category 2). Thus there is more user overlap between vertical categories 1 and 3 than vertical categories 1 and 2.

In some implementations, the symmetric similarity matrix can be generated based on event data from only users having event data that specify certain events. For example, the symmetric similarity matrix can be generated based on event data for only users having event data that specify the event of clicking on a specific advertisement. Thus only users having event data that specify a click on the particular advertisement will be used to generate the symmetric similarity matrix, i.e., the set of users is restricted based on the event of clicking the advertisement. The restricting event(s) need not be limited to clicking on an advertisement but can include any subset of the events or event data.

A symmetric similarity matrix based on event data from a restricted set of users will be different from a symmetric similarity matrix based on event data from all users. In some implementations, the equal similarity measures determined from such a symmetric similarity matrix can be used to identify vertical categories to which an advertisement can be targeted (e.g., increase the number of vertical categories to which an advertisement is targeted and/or change the vertical categories to which an advertisement is targeted). For example, a symmetric similarity matrix can be generated based on event data for only users having event data that specify the event of clicking on advertisement A, which belongs to vertical category 1. If the equal similarity measures indicate a high similarity between vertical category 1 and vertical category 5, then advertisement A can be targeted to both vertical category 1 and vertical category 5.

Although the symmetric association data generated in the above example is based on inferred user interests derived from web page views, advertisement clicks, and conversions, the symmetric association data can also be based on inferred user interests derived from any of the data stored in the event data store 114 and/or user profile data store 128. For example, the inferred user interests can also be based on data derived from a user's social networking profile.

§2.5 Advertisement Selection Module

The vertical similarity module 112 can include an advertisement selection module 120. The advertisement selection module 120 can select advertisements for user sessions associated with a user based on the symmetric association data. In some implementations, the advertisement selection module 120, or the advertisement management system 104, can identify or access information identifying a web page that is being presented on a user device (e.g., client device 108) during a user session for a user. For example, publishers may provide information identifying the web page being presented to the advertisement selection module 120. The advertisement selection module 120 can identify a vertical category to which the web page belongs, for example, from data stored in the vertical category data store 122.

The advertisement selection module 120 can determine or identify a vertical category similar to the vertical category to which the web page belongs based on the symmetric association data (e.g., the equal similarity measures). For example, if the web page belongs to an entertainment/music vertical category, the advertisement selection module 120 can determine from the symmetric association data which vertical category or categories is (are) similar (e.g., has the highest equal similarity measure) to the entertainment/music vertical category.

Once a similar vertical category has been determined, the advertisement selection module 120 can select an advertisement (e.g., from the advertisements data store 124) that belongs to the vertical category determined to be similar to the vertical category to which the web page belongs (e.g., entertainment/music vertical category). The advertisement selection module 120 can also select an advertisement belonging to the vertical category to which the web page belongs.

The advertisement selection module 120 or the advertisement management system 104 can then provide the advertisement selected from the similar vertical category and/or the advertisement from the vertical category to which the web page belongs for display on the user device. For example, the advertisement selection module 120 or the advertisement management system 104 can provide the advertisement to a publisher 106 so that the publisher 106 can present the web page and the advertisement(s).

Although the symmetric association data has been described in the context of selecting advertisements, the symmetric association data can also be used for other purposes. For example, the symmetric association data can be used to define clusters of users and permit advertisers to target the clusters, to enhance advertisement click/conversion prediction models, to find user friends (e.g., like minded users), to create advertiser survey panels to define a customer base, etc.

§3.0 Example Process Flows

Figure 2:
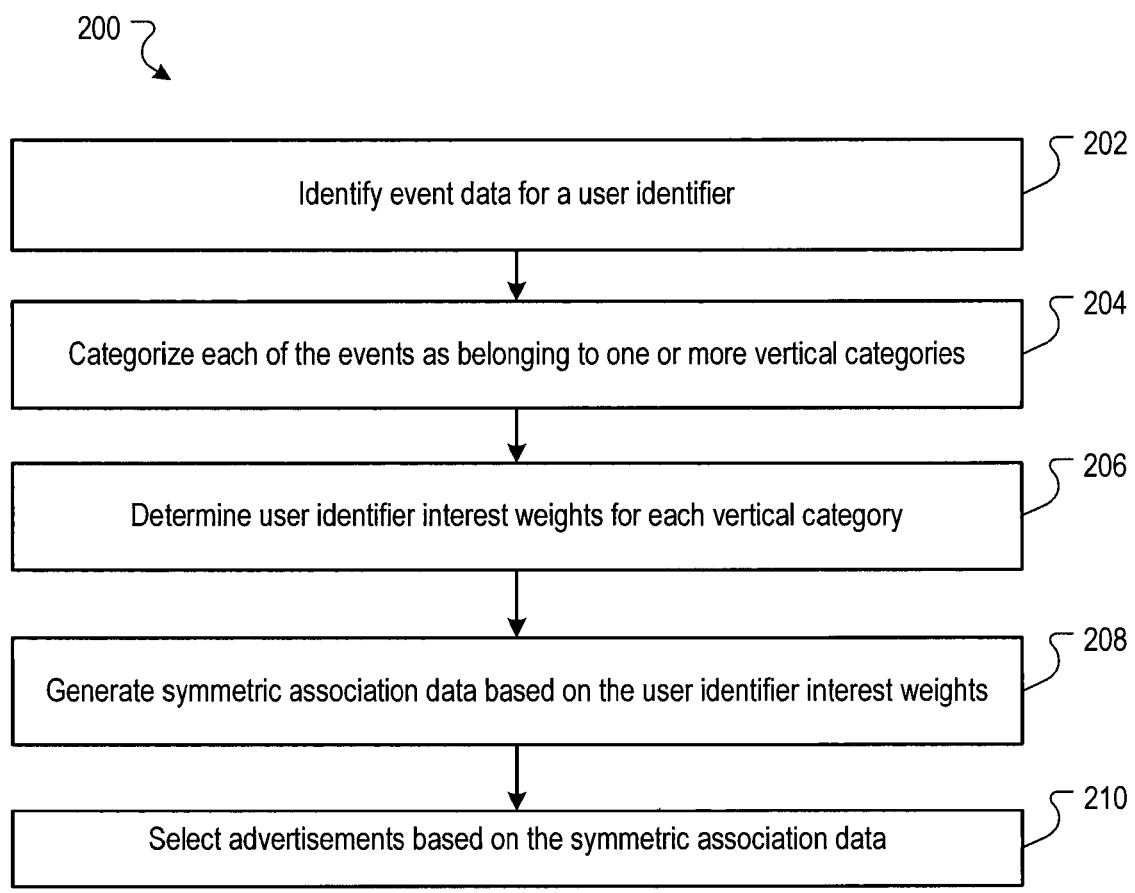
FIG. 2 is a flow chart of an example process for selecting advertisements based on symmetric associations.

FIG. 2 is a flow chart of an example process 200 for selecting advertisements based on symmetric associations. The process 200 can, for example, be implemented in the vertical similarity module 112 and/or the advertisement management system 104.

Event data for a user identifier based on past user sessions associated with the user identifier is identified (202). The event data specify events that occurred during the past user sessions. The events can include page views of web pages, advertisement click-throughs, and/or conversions. For example, the user interest module 116 can identify event data and/or user profile data.

Each of the events is categorized as belonging to one or more vertical categories (204). For example, the user interest module 116 can categorize events as belong to particular vertical categories.

For each vertical category, a user identifier interest weight for the user identifier is determined based on the events associated with the vertical category (206). For example, the user interest module 116 can determine user interest weights for user identifiers in the vertical categories.

Symmetric association data representative of a symmetric association of a vertical category with at least one other vertical category is generated based on the user identifier interest weights (208). The symmetric associations are pairs of equal similarity measures. An equal similarity measure is based on a first similarity measure of a first vertical category relative to a second vertical category and a second similarity measure of the second vertical category relative to the first vertical category. For example, the symmetric association module 118 can generate symmetric associations.

Advertisements for user sessions associated with a user identifier are selected based on the symmetric association data (210). For example, the advertisement selection module 120 can select advertisements for user sessions associated with a user identifier based on the symmetric association data.

Figure 3:
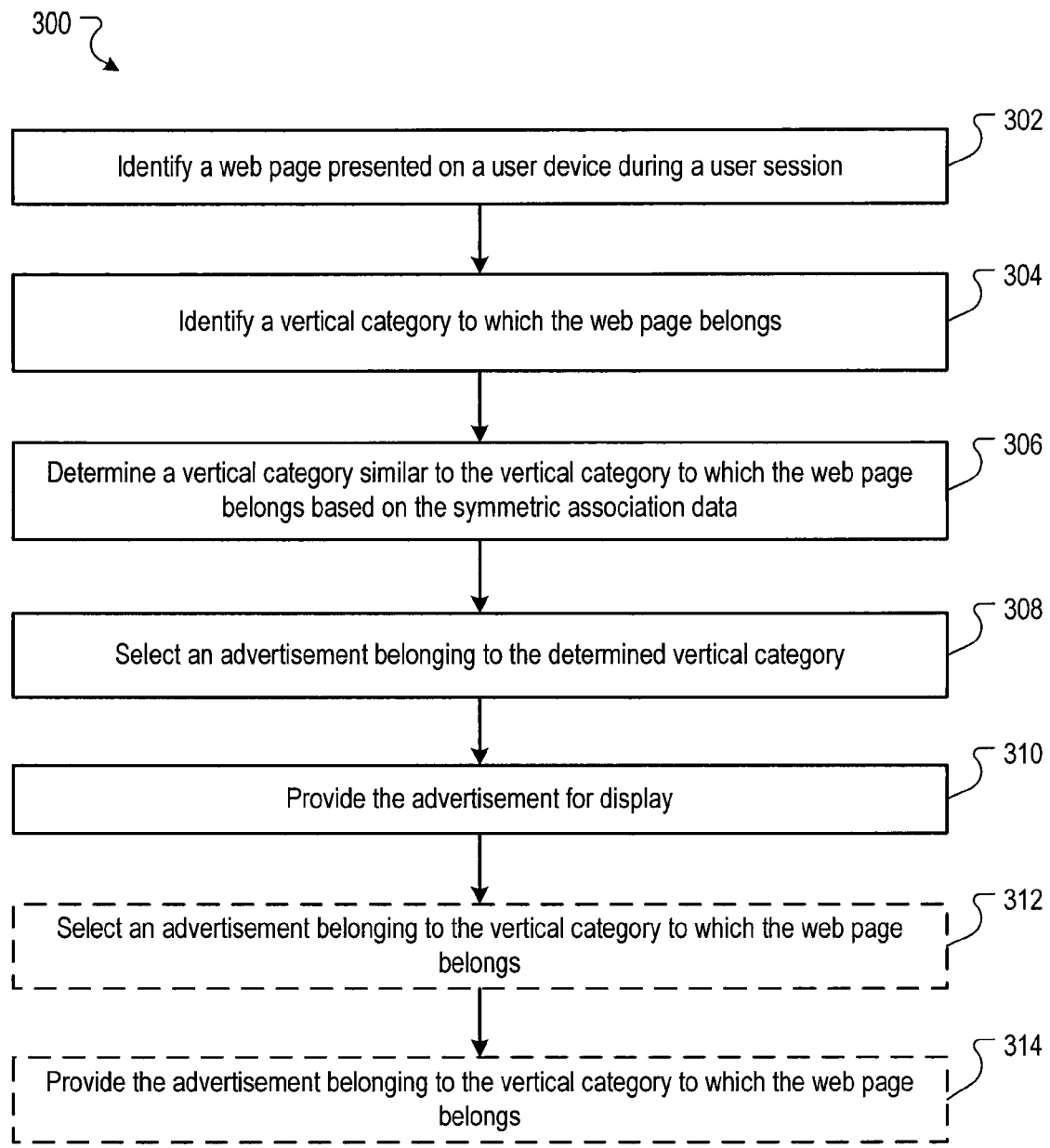
FIG. 3 is flow chart of an example process for identifying advertisements for selection.

FIG. 3 is flow chart of an example process 300 for identifying advertisements for selection. The process 300 can, for example, be implemented in the vertical similarity module 112 and/or the advertisement management system 104.

A web page presented on a user device during a user session is identified (302). For example, the advertisement selection module 120 and/or the advertisement management system 104 can identify or access information about the identity of a web page presented on a user device during a user session.

A vertical category to which the web page belongs is identified (304). For example, the advertisement selection module 120 and/or the user interest module 116 can identify a vertical category to which the web page belongs.

A vertical category similar to the vertical category to which the web page belongs is determined based on the symmetric association data (306). For example, the symmetric association module 118 can determine a vertical category similar to the vertical category to which the web page belongs.

An advertisement belonging to the determined vertical category is selected (308). For example, the advertisement selection module 120 can select an advertisement belonging to the determined vertical category (i.e., the vertical category similar to the vertical category to which the web page belongs).

The advertisement is provided for display on the user device (310). For example, the advertisement management system 104 can provide the advertisement (belonging to the determined vertical category).

An advertisement belonging to the vertical category to which the web page belongs is selected (312). For example, the advertisement selection module 120 can select an advertisement belonging to the vertical category to which the web page belongs.

The advertisement belonging to the vertical category to which the web page belongs is provided for display (314). For example, the advertisement management system 104 can provide the advertisement belonging to the vertical category to which the web page belongs.

Figure 4:
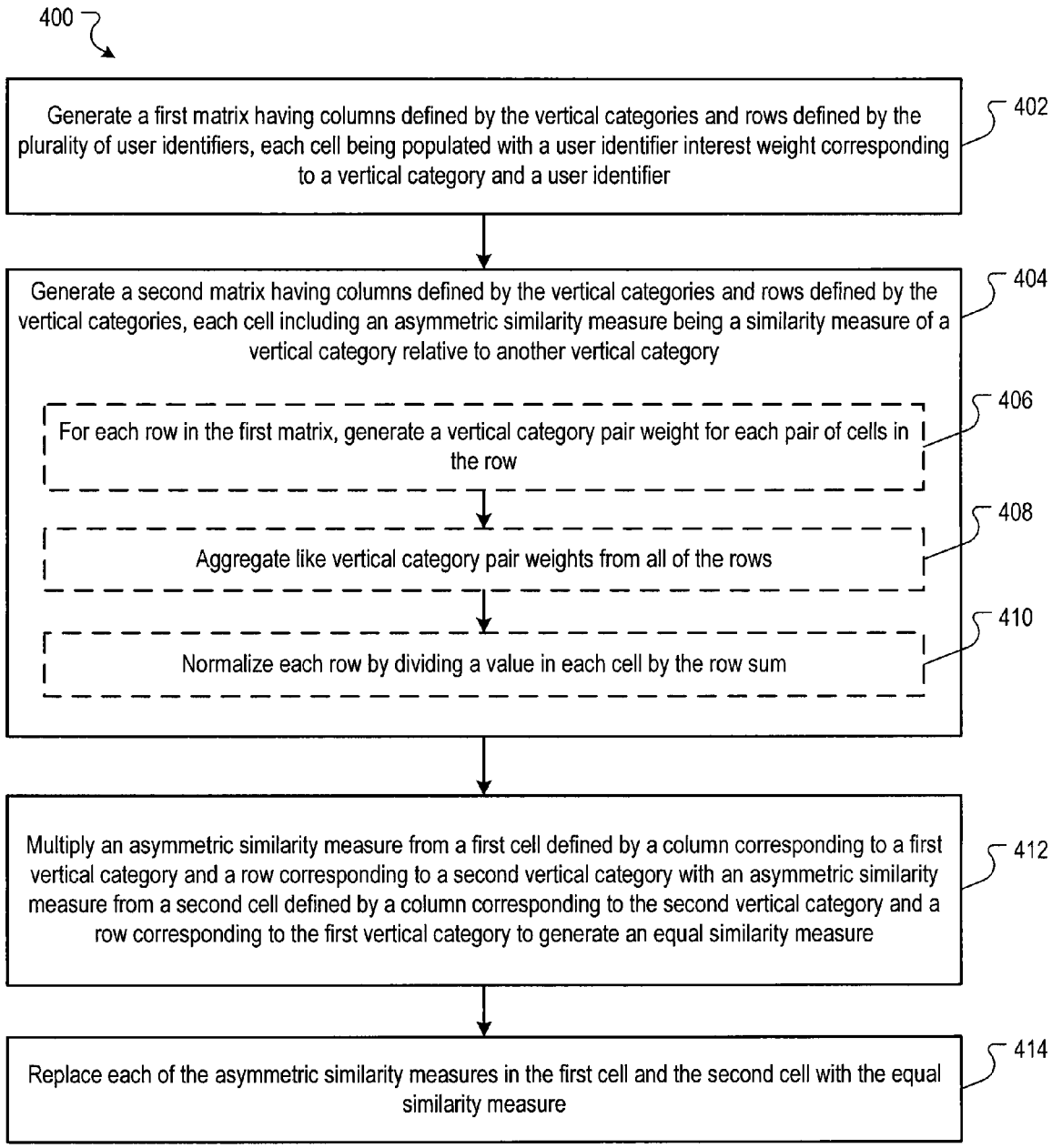
FIG. 4 is flow chart of an example process for generating equal similarity measures.

FIG. 4 is flow chart of an example process 400 for generating equal similarity measures. The process 400 can, for example, be implemented in the vertical similarity module 112 and/or the advertisement management system 104.

A first matrix having columns defined by the vertical categories and having rows defined by the plurality of user identifiers is generated (402). Each of the cells in the first matrix is populated with a user identifier interest weight corresponding to a vertical category and a user identifier. For example, the symmetric association module 118 can generate the first matrix.

A second matrix is generated from the first matrix (404). The second matrix has columns defined by the vertical categories and rows defined by the vertical categories. Each of the cells in the second matrix includes an asymmetric similarity measure. The asymmetric similarity measure is a similarity measure of a vertical category relative to another vertical category. For example, the symmetric association module 118 can generate the second matrix.

For each row in the first matrix, a vertical category pair weight for each pair of cells in the row is generated based on a minimum user identifier interest weight from the user identifier interest weights of the pair of cells and an aggregation of all of the user identifier interest weights in the row (406). For example, the symmetric association module 118 can generate the vertical category pair weights.

Like vertical category pair weights from all of the rows are aggregated (408). For example, the symmetric association module 118 can aggregate like vertical category pair weights.

Each row is normalized by dividing a value in each cell by the row sum (410). For example, the symmetric association module 118 can normalize the rows.

An equal similarity measure is generated by multiplying an asymmetric similarity measure in a first cell defined by a column corresponding to a first vertical category and a row corresponding to a second vertical category with an asymmetric similarity measure in a second cell defined by a column corresponding to the second vertical category and a row corresponding to the first vertical category (412). For example, the symmetric association module 118 can generate an equal similarity measure.

Each of the asymmetric similarity measures in the first cell and the second cell are replaced with the equal similarity measure (414). For example, the symmetric association module 118 can replace the asymmetric similarity measures in the first cell and the second cell with the equal similarity measure.

§4.0 Example Processing System

Figure 5:
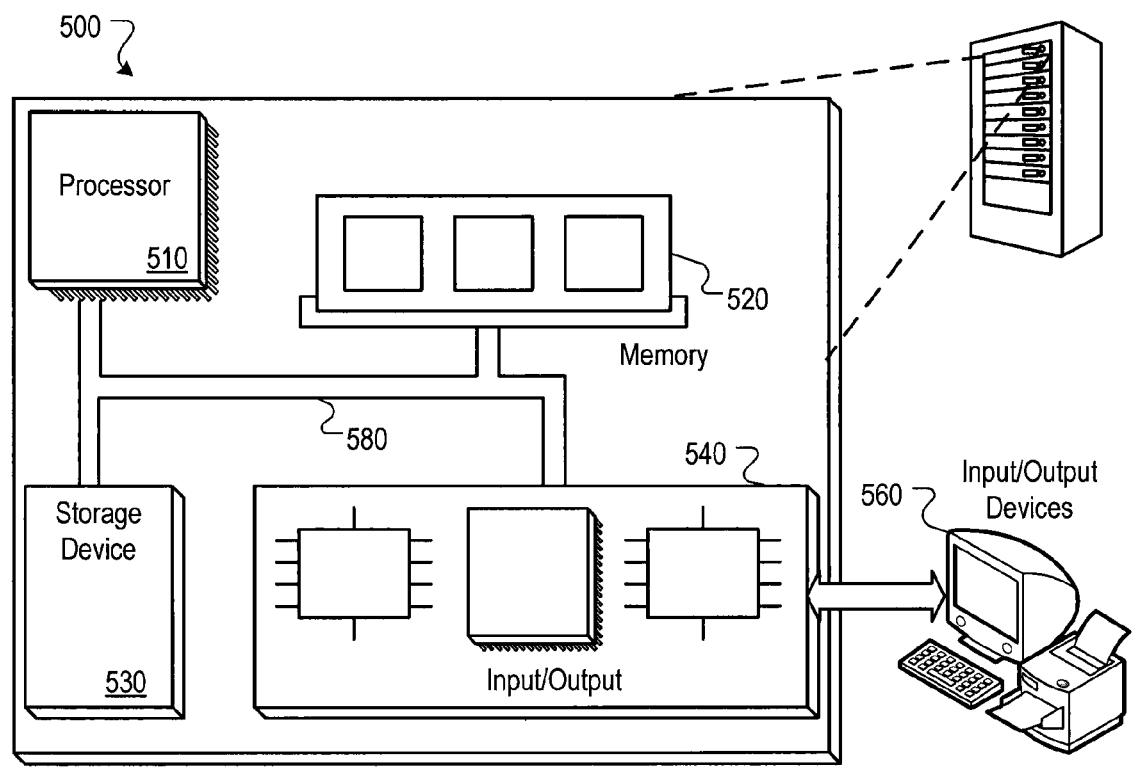
FIG. 5 is a block diagram of an example computer processing system that can be used to implement the vertical similarity module.

FIG. 5 is block diagram of an example computer processing system 500 that can be used to determine symmetric association data and select advertisements based on the symmetric association data. The system 500 can be used to realize a variety of different types of computer devices, such as the client devices 108 or server and computer devices on which the advertising system 104 and the vertical similarity module 112 are implemented.

The system 500 includes a processor 510, a memory 520, a storage device 530, and an input/output device 540. Each of the components 510, 520, 530, and 540 can, for example, be interconnected using a system bus 580. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, etc.

Although an example processing system has been described in FIG. 5, embodiments of the subject matter and the functional operations described in this specification can be implemented in other digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying Figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
for each of a plurality of user identifiers:
identifying event data for a user identifier based on past user sessions associated with the user identifier, the event data specifying events that occurred during the past user sessions;
categorizing each of the events as belonging to one or more vertical categories;
for each vertical category, determining a user identifier interest weight for the user identifier based on the events associated with the vertical category;
for each pair of vertical categories, generating, by one or more processors, asymmetric association data representative of an asymmetric association between a first vertical category and a second vertical category of the pair of vertical categories based on the user identifier interest weights, the asymmetric association data being a pair of a first asymmetric similarity measure and a second asymmetric similarity measure, wherein:
the first asymmetric similarity measure is based on an asymmetric similarity measure of the first vertical category with respect to the second vertical category;
the second asymmetric similarity measure is based on an asymmetric similarity measure of the second vertical category with respect to the first vertical category; and
the first asymmetric similarity measure is different from the second asymmetric similarity measure;
for each pair of vertical categories, generating symmetric association data representative of a symmetric association between the first and second vertical categories of the pair of vertical categories, the symmetric association being a pair of equal similarity measures with a first equal similarity measure of the pair being a symmetric similarity measure of the first vertical category with respect to the second vertical category and a second equal similarity measure of the pair being a symmetric similarity measure of the second vertical category with respect to the first vertical category where each equal similarity measure is based on the corresponding first and second asymmetric similarity measures for the first and second vertical categories, and wherein the first equal similarity measure is equal to the second equal similarity measure; and
selecting advertisements for user sessions associated with a user identifier based on the symmetric association data.

2. The method of claim 1, wherein generating the symmetric association data comprises:
generating a first matrix having columns defined by the vertical categories and having rows defined by the plurality of user identifiers, the columns and rows defining cells, each of the cells being populated with a user identifier interest weight corresponding to a vertical category and a user identifier; and
generating a second matrix from the first matrix, the second matrix having columns defined by the vertical categories and rows defined by the vertical categories, the columns and rows defining cells, each of the cells including an asymmetric similarity measure.

3. The method of claim 2, wherein generating the symmetric association data comprises:
generating an equal similarity measure based on:
an asymmetric similarity measure in a first cell defined by a column corresponding to a first vertical category and a row corresponding to a second vertical category; and
an asymmetric similarity measure in a second cell defined by a column corresponding to the second vertical category and a row corresponding to the first vertical category; and
replacing each of the asymmetric similarity measures in the first cell and the second cell with the equal similarity measure.

4. The method of claim 3, wherein generating an equal similarity measure comprises:
multiplying the asymmetric similarity measure in the first cell with the asymmetric similarity measure in the second cell.

5. The method of claim 2, wherein generating a second matrix comprises:
for each row in the first matrix, generating a vertical category pair weight for each pair of cells in the row based on a minimum user identifier interest weight from the user identifier interest weights of the pair of cells, and an aggregation of all of the user identifier interest weights in the row; and
aggregating like vertical category pair weights from all of the rows.

6. The method of claim 1, wherein the events include page views of web pages, advertisement click-throughs, or conversions.

7. The method of claim 1, comprising:
restricting the plurality of user identifiers to only user identifiers associated with event data that specify the event of clicking on a specific advertisement.

8. The method of claim 1, wherein selecting advertisements for user sessions associated with a user identifier based on the symmetric association data comprises:
identifying a web page presented on a user device during a user session;
identifying a first vertical category to which the web page belongs;
determining a second vertical category similar to the first vertical category based on the symmetric association data;
selecting an advertisement belonging to the second vertical category; and
providing the advertisement for display on the user device.

9. The method of claim 1, wherein generating symmetric association data comprises:
generating symmetric association data by use of a symmetric association module.

10. The method of claim 1, wherein an equal similarity measure is a symmetric similarity measure of one vertical category with respect to another vertical category independent of user popularity of the vertical categories.

11. A computer-implemented method, comprising:
determining user identifier interest weights for user identifiers in a plurality of vertical categories based on events that occurred during past user sessions for the user identifiers;

for each pair of vertical categories, generating, by one or more processors, asymmetric association data representative of an asymmetric association between a first vertical category and a second vertical category of the pair of vertical categories based on the user identifier interest weights, the asymmetric association data being a pair of a first asymmetric similarity measure and a second asymmetric similarity measure, wherein:
the first asymmetric similarity measure is based on an asymmetric similarity measure of the first vertical category with respect to the second vertical category;
the second asymmetric similarity measure is based on an asymmetric similarity measure of the second vertical category with respect to the first vertical category; and
the first asymmetric similarity measure is different from the second asymmetric similarity measure;
for each pair of vertical categories, generating symmetric association data representative of a symmetric association of a first vertical category with a second vertical category, the symmetric association being a pair of equal similarity measures where an equal similarity measure is based on the corresponding first and second asymmetric similarity measures, wherein each equal similarity measure of the pair is a same equal similarity measure;
identifying a web page presented on a user device during a user session;
identifying a vertical category to which the web page belongs;
determining a vertical category similar to the vertical category to which the web page belongs based on the symmetric association data;
selecting an advertisement belonging to the determined vertical category; and
providing the advertisement for display on the user device.

12. The method of claim 11, wherein the events include page views of web pages, advertisement click-throughs, or conversions.

13. The method of claim 11, comprising:
selecting an advertisement belonging to the vertical category to which the web page belongs; and
providing the advertisement belonging to the vertical category to which the web page belongs for display on the user device along with the advertisement belonging to the determined vertical category.

14. The method of claim 11, wherein generating symmetric association data comprises:
generating symmetric association data by use of a symmetric association module.

15. A system, comprising:
one or more data processing devices;
software stored on a computer storage apparatus and comprising instructions executable by the one or more data processing devices and upon such execution cause the one or more data processing devices to define:
a user interest module configured to:
for each of a plurality of user identifiers;
identify event data for a user identifier based on past user sessions associated with the user identifier, the event data specifying events that occurred during the past user sessions;
categorize each of the events as belonging to one or more vertical categories; and
for each vertical category, determine a user identifier interest weight for the user identifier based on the events associated with the vertical category;
a symmetric association module configured to:
for each pair of vertical categories, generating asymmetric association data representative of an asymmetric association between a first vertical category and a second vertical category of the pair of vertical categories based on the user identifier interest weights, the asymmetric association data being a pair of a first asymmetric similarity measure and a second asymmetric similarity measure, wherein:
the first asymmetric similarity measure is based on an asymmetric similarity measure of the first vertical category with respect to the second vertical category;
the second asymmetric similarity measure is based on an asymmetric similarity measure of the second vertical category with respect to the first vertical category; and
the first asymmetric similarity measure is different from the second asymmetric similarity measure:
for each pair of vertical categories, generating symmetric association data representative of a symmetric association between the first and second vertical categories of the pair of vertical categories, the symmetric association being a pair of equal similarity measures with a first equal similarity measure of the pair being a symmetric similarity measure of the first vertical category with respect to the second vertical category and a second equal similarity measure of the pair being a symmetric similarity measure of the second vertical category with respect to the first vertical category where each equal similarity measure is based on the corresponding first and second asymmetric similarity measures for the first and second vertical categories, and wherein the first equal similarity measure is equal to the second equal similarity measure; and
an advertisement selection module configured to select advertisements for user sessions associated with a user identifier based on the symmetric association data.

16. The system of claim 15, wherein the symmetric association module is configured to:
generate a first matrix having columns defined by the vertical categories and having rows defined by the plurality of user identifiers, the columns and rows defining cells, each of the cells being populated with a user identifier interest weight corresponding to a vertical category and a user identifier; and
generate a second matrix from the first matrix, the second matrix having columns defined by the vertical categories and rows defined by the vertical categories, the columns and rows defining cells, each of the cells including an asymmetric similarity measure.

17. The system of claim 16, wherein the symmetric association module is configured to:
generate an equal similarity measure based on:
an asymmetric similarity measure in a first cell defined by a column corresponding to a first vertical category and a row corresponding to a second vertical category; and
an asymmetric similarity measure in a second cell defined by a column corresponding to the second vertical category and a row corresponding to the first vertical category; and
replace each of the asymmetric similarity measures in the first cell and the second cell with the equal similarity measure.

18. The system of claim 17, wherein the symmetric association module is configured to:

multiply the asymmetric similarity measure in the first cell with the asymmetric similarity measure in the second cell.

19. The system of claim 16, wherein the symmetric association module is configured to:

for each row in the first matrix, generate a vertical category pair weight for each pair of cells in the row based on a minimum user identifier interest weight from the user identifier interest weights of the pair of cells, and an aggregation of all of the user identifier interest weights in the row; and aggregate like vertical category pair weights from all of the rows.

20. The system of claim 16, wherein the symmetric association module is configured to:

restrict the plurality of user identifiers to only user identifiers associated with event data that specify the event of clicking on a specific advertisement.

21. The system of claim 20, wherein the advertisement selection module is configured to select advertisements for user sessions associated with a user identifier based on symmetric association data derived from event data for the restricted plurality of user identifiers.

22. The system of claim 15, wherein the events include page views of web pages, advertisement click-throughs, or conversions.

\* \* \* \* \*

UNITED STATES PATENT AND TRADEMARK OFFICE
CERTIFICATE OF CORRECTION

PATENT NO. : 8,190,473 B2
APPLICATION NO. : 12/401318
DATED : May 29, 2012
INVENTOR(S) : Angshuman Guha et al.

It is certified that error appears in the above-identified patent and that said Letters Patent is hereby corrected as shown below:

Claim 2, Column 17, Line 65 – delete "being," and insert -- being --, therefor.

Claim 2, Column 18, Line 2 – delete "haying" and insert -- having --, therefor.

Signed and Sealed this
Twenty-fourth Day of July, 2012

David J. Kappos
*Director of the United States Patent and Trademark Office*